Oct. 20, 1931.    E. ANDERSON    1,828,270
METHOD AND APPARATUS FOR BURNING PORTLAND CEMENT
Filed Feb. 14, 1927
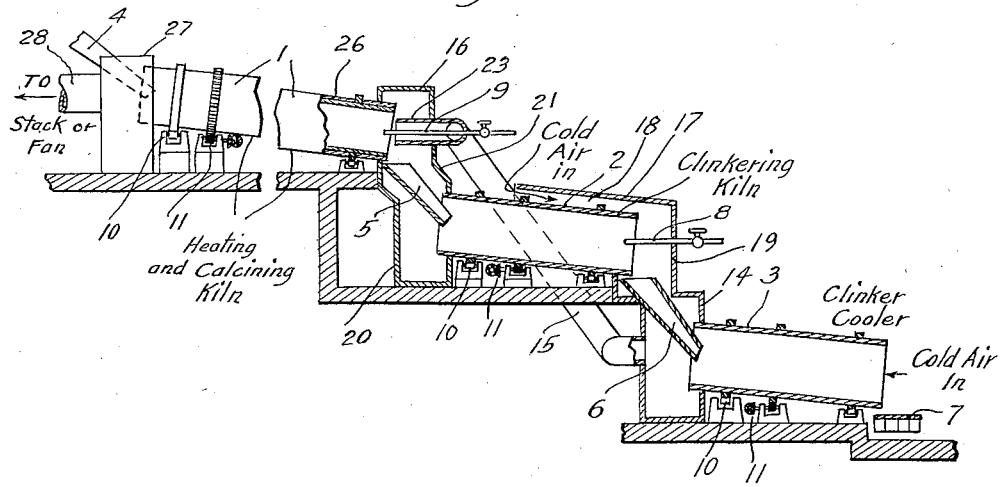
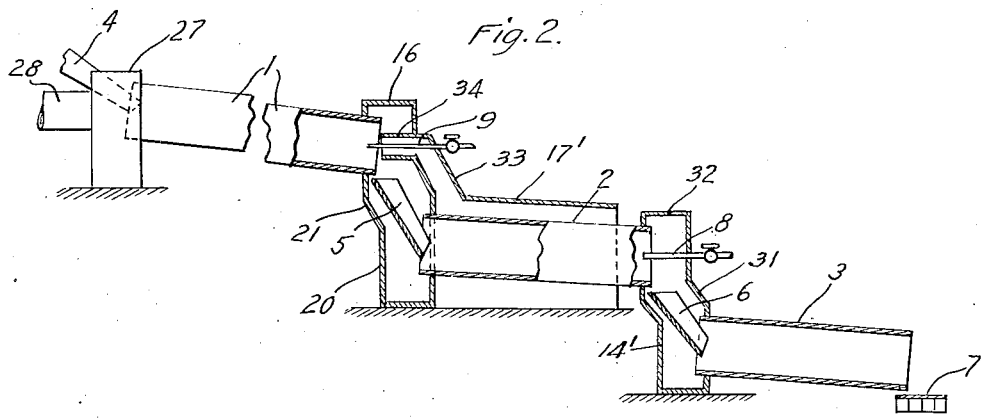
INVENTOR.
Evald Anderson,
BY Arthur P. Knight
and Alfred W. Knight
ATTORNEYS.

Patented Oct. 20, 1931

1,828,270

UNITED STATES PATENT OFFICE

EVALD ANDERSON, OF ALHAMBRA, CALIFORNIA, ASSIGNOR TO INTERNATIONAL PRECIPITATION COMPANY, OF LOS ANGELES, CALIFORNIA, A CORPORATION OF CALIFORNIA

METHOD AND APPARATUS FOR BURNING PORTLAND CEMENT

Application filed February 14, 1927. Serial No. 168,178.

This invention relates to the burning or heating of the usual ingredients of Portland cement to form a clinker which may subsequently be re-ground to produce finished cement. This heating comprises in general three steps, namely, drying the raw ingredients and heating the same to the temperature of calcination, calcining the material (that is driving off the $CO_2$ therefrom), and then heating the calcined material to a sufficient temperature to cause partial sintering of the same and formation of a clinker.

The principal object of this invention is in general to provide for more efficient utilization and recovery of heat in this operation and a consequent reduction in the fuel requirement thereof.

A particular object of the invention is to provide for more complete utilization of heat in the combustion gases for the purpose of heating and drying the raw material.

A further object of the invention is to provide for maximum utilization of heat in the process without requiring the use of waste heat boilers, heat interchangers and the like for recovering heat from the gases used in the process.

Other objects and advantages of the invention will appear hereinafter.

In the ordinary methods of burning Portland cement, in which the raw material is subjected to the successive operations of heating to calcining temperature, calcining, clinkering, and a final partial cooling of the clinker, in a single kiln, there is an inevitable loss of heat from the exit gases of the kiln as may be seen from the following considerations. In this customary process the raw material, consisting in general of an inter-ground mixture of a plurality of ingredients calculated to give the proper composition in the finished cement, enters at the upper end of the kiln and passes downwardly therethrough, while a stream of hot combustion gases is passed upwardly in counter current thereto. The fuel and air are admitted at the lower end of the kiln and the air is first pre-heated to a greater or less extent by the clinker leaving the kiln, inasmuch as the combustion zone or zone of highest temperature is somewhat above the lower end of the kiln. In the zone of combustion, the combustion gases are heated to the maximum temperature by combustion of the fuel with the air so pre-heated.

The combustion gases must then give up enough heat in the clinkering zone to raise the temperature of the material from calcining temperature or about 1500° F., to clinkering temperature or about 2500° F., and in giving up this amount of heat the temperature of the combustion gases is reduced considerably below the maximum flame temperature before such gases enter the calcining zone. Such gases, however, must still contain enough heat to effect the calcining operation without having their temperature reduced materially below approximately 1700° F., as the calcining reaction or liberation of $CO_2$ does not occur at an appreciable rate below approximately 1500° F. and the gases must pass out of the calcining zone at a temperature somewhat above this in order to be able to heat the raw material up to calcining temperature before it enters the calcining zone. The amount of heat which can be given up by the gases in the calcining zone under these conditions is a function of the product of the quantity of such gases and the possible temperature drop of the gases in such zone. Therefore, in view of the definite limitation of about 1700° F. on the temperature of the gases leaving the calcining zone, the necessary amount of heat may theoretically be obtained either by the provision of a relatively high initial gas temperature in the calcining zone with a relatively small amount of combustion gases, or by the use of a larger volume of combustion gases with a lower initial gas temperature in the calcining zone. A practical limitation is placed on the former of these two methods, however, in that the gases entering the calcining zone are necessarily considerably below the maximum flame temperature as above stated, and the maximum flame temperature can not be raised above a certain point in the clinkering zone without excessive deterioration of the lining of the kiln and also for other operating reasons. It is therefore impossible by this method of burning to reduce the quantity of combustion gases below a certain amount and this quantity of combustion gases must leave the calcining zone at a temperature of approximately 1700° F.

In the remaining portion of the kiln, heat is removed from these gases in sufficient quantity to dry the raw material and heat it from the temperature at which it enters the kiln, for example roughly 100° F., to calcining temperature or 1500° F. The quantity of gases required for the calcining operation as above described is so large, however, that the removal therefrom of sufficient heat to effect this heating of an equivalent amount of raw material and even to effect the evaporation of the water from the slurry in the wet process does not reduce the temperature of the gas to a point reasonably approximating atmospheric temperature and the gases leaving the kiln therefore contain a considerable quantity of the heat which was supplied thereto, and this heat is wasted unless suitable additional heat recovering equipment, such as heat interchangers or waste heat boilers, is provided. The recovery of heat from such gases is, furthermore, difficult and inefficient because of the fact that this heat is contained in a relatively large amount of gases at a relatively low temperature, so that the necessary heat recovering equipment for this purpose is both cumbersome and costly.

The method and apparatus for burning Portland cement according to my invention provide for conducting the calcining and clinkering operations in separate kilns and for separate firing or combustion in the calcining zone and in the clinkering zone, and for the pre-heating of separate supplies of air for use in both of these combustion operations. Furthermore, I propose to pass the hot combustion gases from the clinkering kiln into and through the calcining kiln so as to permit heat contained therein to be utilized in the calcining and preliminary heating of the material, as well as the heat resulting from combustion occurring in the calcining zone. For this purpose the combustion gases leaving the clinkering kiln are mixed with the combustion gases produced by combustion at the lower end of the calcining kiln, so that these mixed gases are utilized to effect the calcining and heating operations. The provision for separate combustion in the calcining zone permits a higher initial gas temperature to be maintained in this zone than can be maintained in the ordinary single kiln process. This is for the reason that a higher gas temperature may be maintained in the calcining zone than in the clinkering zone without causing excessive deterioration of the lining of the kiln, as hereinafter explained. In view of this higher initial gas temperature a smaller amount of gases are required to effect the calcining operation and as this smaller amount of gases leaves the calcining zone at approximately the same temperature as before, namely about 1700° F., it will be apparent that a smaller amount of heat will be contained in the gases leaving the calcining zone and a greater proportion of this heat may therefore be absorbed in drying the raw material and heating it up to the calcining temperature, such drying and heating being preferably carried out in the upper portion of the calcining kiln. This kiln may therefore more properly be termed a heating and calcining kiln. It is possible by this means to reduce the temperature of the exit gases from this kiln to a much lower temperature than heretofore, for example to 300 or 400° F. A minmum amount of heat is therefore lost from the process and consequently a minimum fuel consumption is required. Furthermore no cumbersome and costly heat recovering apparatus such as waste heat boilers and the like are required.

I am aware that the broad idea of separate firing or combustion in the clinkering and calcining zones is not new, but the particular method and apparatus which I have devised are new insofar as I am aware, and possess certain advantages over any method and apparatus heretofore proposed for this purpose.

The accompanying drawings illustrate apparatus according to my invention and referring thereto.

Fig. 1 is a vertical section partly in elevation of one form of apparatus.

Fig. 2 is a similar view of another form of apparatus.

The apparatus comprises in each case a rotary heating and calcining kiln 1, a rotary clinkering kiln 2 and a rotary or other type of clinker cooler 3. The rotary devices or elements 1, 2, and 3 are provided with the usual means 10 for rotatably supporting the same, and with the usual means 11 for rotating the same at the desired speed, these means being shown in Fig. 1 but omitted from Fig. 2, which is purely diagrammatic. The apparatus further includes feeding means such as chute 4, for supplying the material to the upper end of the heating and calcining kiln, chute 5 for conducting material from the calcining kiln to the clinkering kiln, chute 6 for conducting the material from the clinkering kiln to the clinker cooler, and suitable conveying means such as belt conveyor 7 for carrying the material away from the clinker cooler. Burner means 8 and 9 are also provided for introducing suitable fuel such as gas, fuel oil or powdered coal, in the lower ends of the clinkering and calcining kilns respectively.

In the apparatus shown in Fig. 1 the upper end of the clinker cooler 3 opens into a hood or casing 14 which is connected by means of flue 15 to the hood or casing 16 surrounding the lower end of the heating and calcining kiln 1. A hood or jacket 17 is placed around and above the clinkering kiln 2 and extends throughout the greater part of the length thereof so as to provide an annular space 18 around the kiln which is in communication with the hood or chamber 19 at the lower end of the kiln.

The upper end of clinkering kiln 2 opens into a hood or casing 20 which is connected by passage means 21 to the casing 16 aforesaid. The upper end of the heating and calcining kiln 1 opens into a hood or casing 27 from which flue 28 conducts the gases to a stack or fan for exhausting to the atmosphere. It will be noted that in this form of the invention there is no communication between the casing 14 and chamber 19 other than through chute 6 so that the heated air from the clinker cooler is caused to pass substantially wholly through flue 15. The heating and calcining kiln 1 may advantageously be provided with a covering 26 of suitable heat insulating material such as asbestos or diatomaceous earth composition.

The quantities of air and combustion gases passed through the kilns may be controlled in any suitable manner as is customary in apparatus of this type, for example, by means of the usual dampers placed at suitable points, or by controlling the speed of the fans when the same are employed, or by combined fan and damper control.

In carrying out the burning operation in this form of apparatus the air for combustion in the clinkering kiln is preheated by being drawn in through the annular space 18 surrounding this kiln due to either natural or induced draft. In passing through this space the air receives heat which is radiated or dissipated from the exterior of the kiln and which would otherwise be lost. The fuel introduced through burner means 8 is burned with this pre-heated air in the lower portion of kiln 2 to produce the body of hot combustion gases required to effect the clinkering operation. In passing upwardly through the clinkering kiln these hot combustion gases give up heat to the material in the kiln and are themselves cooled to a temperature somewhat above calcining temperature for example to about 1700° F. This is in marked distinction to the usual method of cement burning in which the hot combustion gases must leave the clinkering zone, while still containing sufficient heat to effect the calcining operation without having their temperature lowered below about 1700° F. In view of this much lower temperature to which the gases may be reduced in the clinkering kiln the amount of gases required for this operation is relatively quite small. This is apparent if it be considered that the heat required to effect the clinkering of the material is the same as in the ordinary single kiln process, and that the initial temperature of the combustion gases in the clinkering kiln may also be substantially the same as the initial temperature in the single kiln process using pre-heated air for combustion. As pointed out above, in the single kiln process the combustion gases passed through the clinkering zone must be of such an amount that after completing the clinkering operation, they will have enough heat left in them to effect the calcination without being reduced below about 1700° F. In the process of this invention, on the other hand, the only definite requirement of the gases passed through the clinkering kiln is that they contain sufficient heat to effect the clinkering operation without being reduced below a temperature somewhat above the temperature at which the calcined material enters such kiln. It is evident, therefore, that since the combustion gases may in this case leave the clinkering zone at a much lower temperature than in the single kiln process, the heat required for the clinkering operation may be derived from a much smaller amount of gases than in the single kiln process. These combustion gases after leaving the clinkering kiln pass from the clinkering kiln into casing 20 and through passage 21 into casing 16 from which they are drawn into the heating and calcining kiln as hereinafter described.

Air is also drawn in at the lower end of the clinker cooler 3 and is heated therein by the clinker and conducted through flue 15 to the chamber 16 and into the lower end of the heating and calcining kiln 1 where it is utilized for combustion of fuel supplied through burner means 9. It should be noted here that as the outlet 23 of flue 15 is located immediately around or adjacent the burner 9, the air passing therethrough will be introduced into kiln 1 in intimate contact with the fuel so as to provide for good combustion of the fuel, while the combustion gases from the clinkering kiln enter the calcining kiln adjacent the edges thereof and around the body of air for combustion so that these combustion gases do not interfere with the burning of the fuel supplied through burner 9. By the use of pre-heated air an extremely high flame temperature may be obtained, and although this flame temperature will be reduced somewhat due to the admisssion of the gases from the clinkering kiln at this point, a much higher initial gas temperature may be maintained in the calcining zone than by the usual practice above outlined. It should be noted here that it is practicable to operate with a considerably higher flame temperature in the calcining zone than in the clinkering zone due to the absorption of heat in the calcining operation and a consequent cooling of the lining by contact with the material undergoing calcination. Furthermore, the combustion gases from kiln 2, which are at a relatively low temperature, are admitted adjacent the periphery of kiln 1 and these gases will therefore tend to have a cooling effect upon the lining. It is possible therefore by rapid rotation of the calcining kiln to operate at the unusually high gas temperature resulting from the use of preheated air, without causing excessive deterioration of the lining. It is also possible to heat insulate the outside of this kiln as shown, even around the zone of combustion, because of the absorption of heat in the reaction, and to thus further conserve heat and assist in maintaining a maximum flame temperature. In view of the high intitial gas temperature thus provided in the calcining zone a much smaller amount of combustion gases are required to furnish the necesssary amount of heat for calcination than are required in the ordinary process. This is readily apparent when it is considered that under these conditions the combustion gases may be cooled in the calcining zone from this relatively high initial temperature down to about 1700° F., whereas in the ordinary process of cement burning the temperature of the gases entering the calcining zone is necessarily much lower than this, and the temperature to which they may be cooled in this zone is the same as above. Since the available temperature drop is, therefore, much greater than in the ordinary process a much smaller quantity of gases will suffice to furnish the necessary heat for calcination.

After leaving the calcining zone the gases pass upwardly through the remaining portion of the kiln 1 and serve to dry the raw material and heat the same up to calcining temperature. In view of the fact that the amount of combustion gases leaving the calcining zone may be made relatively small and the correspondingly small amount of heat contained therein, upon leaving the calcining zone may be correspondingly small, these gases may be cooled to only slightly above atmospheric temperature in this manner and substantially all of the recoverable heat may thus be utilized. Actual calculations have shown in fact that it should be possible by the use of this method to cool the exit gases from the calcining kiln to about 300 or 400° F. so that the amount of heat lost in these gases is very much less than in the ordinary process in which the exit gases from the kiln usually have a temperature of from 900 to 1400° F. As a result of this it is possible, at least in the dry process, to burn clinker with only about half the present fuel consumption.

It will be understood of course that during the above described operations the raw material, consisting in general of an inter-ground mixture of limestone and clay or similar materials in proper proportions for production of Portland cement, is introduced through chute 4 into the upper end of kiln 1 and passes downwardly therethrough. In the upper portion of such kiln the raw material is dried and heated to calcining temperature or about 1500° F., and is then calcined, that is to say the $CO_2$ is driven off from the limestone, in the lower portion of the kiln. The material, still at a temperaure of about 1500°·F., then passes through chute 5 into the upper end of kiln 2, in which it is gradually increased in temperature until it reaches the zone of highest temperature, at which time its temperature is sufficient to cause partial sintering or clinkering of the material. It is then discharged from kiln 2 through chute 6 into the clinker cooler 3 wherein its temperature is lowered by the incoming cold air and the cooled clinker is finally delivered onto the conveyor 7 and carried to any suitable point for further treatment or handling.

Among the advantages obtained by the above described method are the following:

Heat which would otherwise be lost is either saved or recovered in the following ways. First, a considerable proportion of the heat in the clinker is utilized to heat a supply of air for combustion in the calcining zone thereby enabling an extremely high flame temperature to be obtained in such zone; second, heat which would otherwise be lost by radiation from the clinkering kiln is utilized to heat a supply of air for combustion in such kiln; third, the loss of heat by radiation or conduction from the calcining kiln is reduced to the minimum by covering the same with heat insulating material. It should be noted in this case that it is not feasible to heat insulate the clinkering kiln, as the clinkering operation does not absorb any heat, but consists merely in raising the temperature of the material. It is therefore necessary to permit some dissipation of heat from the exterior of this kiln so as to prevent the same from becoming too hot. According to my invention I permit this dissipation of heat from this kiln to occur and may in fact increase the same to some extent due to the drawing in of a body of cool air confined in close contact with the exterior of the kiln, but the heat thus dissipated is utilized to preheat air for combustion and is thus restored to the process. In the calcining kiln, on the other hand, it is possible to cut down the dissipation of heat therefrom by the use of heat insulating material for the reasons above mentioned.

The principal advantage of the invention, however, lies in the provision of an extremely high initial gas temperature in the calcining zone, which for the reasons above mentioned permits a smaller quantity of gases to be used than is required in the ordinary cement burning process, and consequently permits a more complete absorption of heat from these gases by the raw material in the preliminary heating zone at the upper end of the calcining kiln. The exit gases from this kiln are therefore relatively cool, and the heat lost therein is reduced to a minimum. It will be seen that all of the factors above mentioned contribute toward maximum efficiency of heat utilization in the process and consequently reduce to a minimum the amount of fuel required therefor.

A further advantage is that no waste heat boilers, or other costly and cumbersome heat recovering devices are necessary, as substantially all of the heat of the combustion gases is utilized within the kilns themselves, with the exception of that dissipated from the clinkering kiln and utilized to pre-heat air for combustion.

A somewhat modified form of apparatus is shown in Fig. 2. In this case the hood 14' surrounding the upper end of clinker cooler 3 is directly connected by passage 31 to the hood or chamber 32 at the lower end of the clinkering kiln 2 so as to permit the heated air from the clinker cooler to be utilized for combustion in the clinkering kiln rather than in the calcining kiln. The jacket 17' surrounding the clinkering kiln is connected by a passage 33 to air supply means 34 adjacent burner 9 so as to supply the air heated by the dissipation of heat from the clinkering kiln to support combustion in the calcining kiln. The remainder of the apparatus is substantially the same as above described and the method as carried out in this apparatus is substantially the same as before except for the manner of heating the two supplies of air for supporting combustion in the respective kilns. It is obvious that the same advantages may be realized in this case as in the form first described.

I claim:

1. The method of burning Portland cement which comprises subjecting a suitable mixture of cement-forming ingredients to successive heating, calcining, clinkering and cooling operations, pre-heating a supply of air by effecting said cooling operation therewith, pre-heating a separate supply of air by means of heat dissipated from the clinkering operation, delivering one of said supplies of pre-heated air substantially wholly to support combustion of fuel and produce a body of hot combustion gases, effecting said clinkering operation with said hot combustion gases, delivering the other supply of pre-heated air substantially wholly for combustion of a separate supply of fuel to produce another body of hot combustion gases, mixing therewith said first-named combustion gases leaving the clinkering operation, and effecting said heating and calcining operations with such mixed combustion gases.

2. The method of burning Portland cement, which comprises passing a suitable mixture of cement forming ingredients downwardly and successively through a heating and calcining zone, a clinkering zone, and a clinker cooling zone, passing air in position to receive heat dissipated from the clinkering zone, delivering the air so pre-heated for combustion of fuel and passing the resulting hot combustion gases upwardly through the clinkering zone, passing a further quantity of air upwardly through the clinker cooling zone to receive heat from the clinker, delivering such further quantity of air so pre-heated substantially wholly for combustion of fuel at the lower end of the heating and calcining zone, conducting the combustion gases from the upper end of the clinkering zone to the lower end of the heating and calcining zone and mixing them with the combustion gases resulting from the last-named combustion operation, and passing the resulting mixture of gases upwardly through the heating and calcining zone.

3. An apparatus for burning Portland cement comprising a rotary heating and calcining kiln, a rotary clinkering kiln, and a clinker cooler, means for passing solid material successively through said rotary kilns and said cooler, burner means for supplying fuel to the lower end of the heating and calcining kiln, burner means for supplying fuel to the lower end of the clinkering kiln, means for supplying air in proximity to said last-named burner means for supporting combustion of fuel supplied thereto, a gas conducting passage connecting the upper end of the clinker cooler with the lower end of the heating and calcining kiln, a second gas conducting passage connecting the upper end of the clinkering kiln with the lower end of the heating and calcining kiln, a jacket surrounding the clinkering kiln throughout the greater portion of its length, and means establishing communication between the space within said jacket and the lower end of the clinkering kiln and adapted to cause substantially the entire air supply for the burner means in the clinkering kiln to be drawn in between said kiln and said jacket.

4. An apparatus for burning Portland cement comprising a rotary heating and calcining kiln open at its lower end, a rotary clinkering kiln and a clinker cooler, means for passing cement-forming ingredients successively through said rotary kilns and said cooler, burner means for supplying fuel to the lower end of the clinkering kiln, means for supplying air in proximity to said burner means to support combustion of fuel supplied therethrough, burner means for supplying fuel to the lower end of the heating and calcining kiln adjacent the central portion of the open lower end thereof, an air conducting passage connected at one end to the upper end of the clinker cooler and opening at its other end into the open lower end of said heating and calcining kiln directly around the point of supply of fuel through the burner means therein, a gas conducting passage connected at one end to the upper end of the clinkering kiln and opening at its other end into the open lower end of said heating and calcining kiln around the outside of said air conducting passage, whereby combustion products from the clinkering kiln are delivered to the heating and calcining kiln in less proximity to the burner means therein than is the air delivered through said air conducting passage, and housing means cooperating with the lower end of said heating and calcining kiln to cause the fuel, air, and combustion products delivered to said kiln to pass upwardly therethrough.

In testimony whereof I have hereunto subscribed my name this 1st day of February, 1927.

EVALD ANDERSON.